United States Patent
Kong et al.

(10) Patent No.: US 11,245,531 B2
(45) Date of Patent: Feb. 8, 2022

(54) METHOD, APPARATUS AND SYSTEM FOR ESTABLISHING BIOMETRIC IDENTIFICATION INFORMATION TRANSMISSION AND STORAGE MEDIUM

(71) Applicant: SHENZHEN GOODIX TECHNOLOGY CO., LTD., Shenzhen (CN)

(72) Inventors: Weiguo Kong, Shenzhen (CN); Bing Wang, Shenzhen (CN); Wenbin Sun, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 344 days.

(21) Appl. No.: 16/453,996

(22) Filed: Jun. 26, 2019

(65) Prior Publication Data
US 2019/0319795 A1 Oct. 17, 2019

Related U.S. Application Data

(63) Continuation of application No. PCT/CN2017/112198, filed on Nov. 21, 2017.

(51) Int. Cl.
*H04L 29/06* (2006.01)
*H04L 9/32* (2006.01)
(Continued)

(52) U.S. Cl.
CPC ............. *H04L 9/3231* (2013.01); *G06F 7/58* (2013.01); *H04L 9/0618* (2013.01); *H04L 9/0869* (2013.01); *H04L 9/0894* (2013.01)

(58) Field of Classification Search
CPC ... H04L 9/3231; H04L 9/0618; H04L 9/0838; H04L 9/0866; H04L 9/0869;
(Continued)

(56) References Cited

U.S. PATENT DOCUMENTS

2006/0107050 A1 5/2006 Shih
2016/0080337 A1 3/2016 Pahl et al.
(Continued)

FOREIGN PATENT DOCUMENTS

CN 101646172 A 2/2010
CN 102883316 A 1/2013
(Continued)

OTHER PUBLICATIONS

First Office Action of the prior Chinese application.
(Continued)

*Primary Examiner* — Malcolm Cribbs
(74) *Attorney, Agent, or Firm* — J.C. Patents

(57) ABSTRACT

The present application provides a method, an apparatus and a system for establishing biometric identification information transmission and a storage medium, including: transmitting a first random number to a driving unit; receiving a second random number and a first identity verification information from the driving unit; generating a key of a first session according to the first random number, the second random number and a pre-shared key, and generating a second identity verification information according to the key of the first session, the first random number and the second random number; transmitting the second identity verification information to the driving unit; and determining, according to the first identity verification information and the second identity verification information, whether a session between a biometric identification apparatus and the driving unit is established successfully. Therefore system overheads is reduced.

17 Claims, 7 Drawing Sheets

(51) Int. Cl.
*G06F 7/58* (2006.01)
*H04L 9/06* (2006.01)
*H04L 9/08* (2006.01)

(58) Field of Classification Search
CPC ..... H04L 9/0894; H04L 63/20; H04L 63/205; G06F 7/58; H04W 12/04; H04W 12/0431; H04W 12/0433
See application file for complete search history.

(56) References Cited

U.S. PATENT DOCUMENTS

| | | | |
|---|---|---|---|
| 2016/0239686 A1* | 8/2016 | Kwon | ............... G06F 21/606 |
| 2017/0111799 A1 | 4/2017 | Zheng | |
| 2018/0183772 A1* | 6/2018 | Jeon | ............... H04L 63/12 |

FOREIGN PATENT DOCUMENTS

| | | |
|---|---|---|
| CN | 103391540 A | 11/2013 |
| CN | 104486759 A | 4/2015 |
| CN | 105608413 A | 5/2016 |
| CN | 105933119 A | 9/2016 |
| CN | 106878235 A | 6/2017 |
| WO | 2011/017847 | 2/2011 |

OTHER PUBLICATIONS

Bhattacharyya, Abhijan et al, "LESS: Lightweight Establishment of Secure Session" 2015 29th International conference on Advanced Information Networking and Applications Workshops, IEEE Computer Society, (Mar. 2015), pp. 682-687.
Moser, Jeff, "The First Few Milliseconds of an HTTPS Connection" Web Blog—http://www.moserware.com/2009/06/first-few-milliseconds-of-https.html, (Jun. 10, 2019).
The extended European Search Report of corresponding European application No. 17 93 3091, dated Oct. 30, 2019.
Dierks, T. et al., "The Transport Layer Security (TLS) Protocol Version 1.2" RTFM, Inc.; Internet Official Protocol Standards (STD 1); (Aug. 2008).
The International Search Report of corresponding international application No. PCT/CN2017/112198, dated Jul. 31, 2018.

* cited by examiner

METHOD, APPARATUS AND SYSTEM FOR ESTABLISHING BIOMETRIC IDENTIFICATION INFORMATION TRANSMISSION AND STORAGE MEDIUM

CROSS-REFERENCE TO RELATED APPLICATIONS

The present application is a continuation of international application No. PCT/CN2017/112198, filed on Nov. 21, 2017, which is hereby incorporated by reference in its entirety.

TECHNICAL FIELD

The present application relates to the field of fingerprint identification, and in particular, to a method, an apparatus and a system for establishing biometric identification information transmission and a storage medium.

BACKGROUND

In recent years, with the continuous development of software and hardware technology, great progress has also been made in fingerprint identification technology. A fingerprint identification process includes: collecting biometric identification information by a sensor, transmitting the biometric identification information by a microcontroller unit (MCU) to a driving unit, and using a driving program to identify the biometric identification information and returning an identification result by the driving unit to the MCU. Currently, a transport layer security (TLS) between a client and a server is used by the MCU and the driving unit to perform the biometric identification information transmission.

The TLS is used to provide confidentiality and data integrity between two communication applications. The TLS protocol includes a TLS record protocol and a TLS handshake protocol. The TLS handshake process between the client and the server includes: the client sends a client hello message to the server, where the client hello message includes a type of cipher suite, a highest SSL/TLS protocol version and a compression algorithm supported by the client and a random number generated by the client; the server sends a server hello message to the client, where the server hello message includes a cipher suite, a compression algorithm and the like selected by the server and a random number generated by the server; the server sends a server key exchange message to the client, where the server key exchange message may include a plurality of available pre-shared keys (PSKs) provided by the server; and the server sends a server hello done message to the client. The client sends a client key exchange message to the server, where the client key exchange message may include a PSK selected by the client; the client sends a client finished message to the server, where the client finished message includes a message authentication code obtained by the client through calculating all messages performed by the client itself using a key of a session between the client and the server generated by the client. The server sends a server finished message to the client, where the server finished message includes a message authentication code obtained by the server through calculating all messages performed by the server itself using a key of a session between the client and the server generated by the server. When the message authentication code of the client is the same as the message authentication code of the server, a session between the client and the server is successfully established.

However, a large number of interactions are involved in the conventional TLS handshake process, resulting in a large system overhead.

SUMMARY

The present application provides a method, an apparatus and a system for establishing biometric identification information transmission and a storage medium, by which a system overhead can be reduced.

In a first aspect, the present application provides a method for establishing biometric identification information transmission, including: transmitting a first random number to a driving unit; receiving a second random number and a first identity verification information from the driving unit; generating a key of a first session according to the first random number, the second random number and a pre-shared key, and generating a second identity verification information according to the key of the first session, the first random number and the second random number; transmitting the second identity verification information to the driving unit, and determining, according to the first identity verification information and the second identity verification information, whether a session between a biometric identification apparatus and the driving unit is established successfully.

The beneficial effect of the present application is that: in the present application, the driving unit or the biometric identification apparatus (client) is not required to select one of a plurality of pre-shared keys, instead, both have been preset with a pre-shared key, and the driving unit in the present application only needs to generate a first identity verification information according to a key of a third session, a first random number and a second random number; similarly, the biometric identification apparatus (client) only needs to generate a second identity verification information according to a key of a first session, the first random number, and the second random number. However, in the prior art, both the client and the server need to generate identity verification information for all TLS messages. In view of the above, the method for establishing biometric identification information transmission provided by the present application reduces the number of handshake interactions, thereby reducing the overhead of a system consisting of the driving unit and the biometric identification apparatus.

Optionally, where the key of the first session includes at least one key of a second session, and the method further includes: when it is determined that the session between the biometric identification apparatus and the driving unit is established successfully, encrypting the biometric identification information by using the key of the first session or the key of the second session to generate a first ciphertext, and transmitting the first ciphertext to the driving unit.

Optionally, where the key of the first session further includes a first value and a key of a first algorithm, where the first value is used to determine a quantity of packets transmitted to the driving unit, and the first algorithm is an algorithm for generating the second identity verification information; the method further includes:

calculating the key of the first algorithm, the first ciphertext and the first value by using the first algorithm to obtain a first check value; transmitting the first check value and the first ciphertext to the driving unit, where the first check value is used to determine whether the first ciphertext is valid.

The beneficial effect of the present application is that: since the key of the first session includes at least one key of a second session, the biometric identification apparatus can use the at least one key of the second session circularly each time information is transmitted instead of using only one fixed key of a session, thereby improving the reliability of the biometric identification information transmission. In addition, the present application can also encrypt the transmission of biometric identification information through the key of the first session, thereby improving the flexibility of biometric identification information transmission.

Optionally, the method further includes: when it is determined that the session between the biometric identification apparatus and the driving unit is established successfully, receiving a second ciphertext from the driving unit; and decrypting the second ciphertext by using the key of the first session or the key of the second session.

Optionally, where the key of the first session further includes a second value, where the second value is used to determine a quantity of packets received from the driving unit; the method further includes: receiving a second check value transmitted by the driving unit; calculating the key of the first algorithm, the second ciphertext and the second value by using the first algorithm to obtain a third check value; and determining whether the second ciphertext is valid according to whether the second check value and the third check value being the same.

In a second aspect, the present application provides a method for establishing biometric identification information transmission, including: transmitting a second random number to a biometric identification apparatus; receiving a first random number and a second identity verification information from the biometric identification apparatus; generating a key of a third session according to the first random number, the second random number and a pre-shared key, and generating a first identity verification information according to the key of the third session, the first random number and the second random number; transmitting the first identity verification information to the biometric identification apparatus; and determining, according to the first identity verification information and the second identity verification information, whether a session between the biometric identification apparatus and a driving unit is established successfully.

The beneficial effects are the same as those of the first aspect, which are not repeated herein.

Optionally, where the key of the third session includes at least one key of a fourth session; the method further includes: when it is determined that the session between the biometric identification apparatus and the driving unit is established successfully, encrypting the biometric identification information by using the key of the third session or the key of the fourth session to generate a second ciphertext; and transmitting the second ciphertext to the biometric identification apparatus.

Optionally, where the key of the third session further includes a third value and a key of a first algorithm, where the third value is used to determine a quantity of packets transmitted to the biometric identification apparatus, and the first algorithm is an algorithm for generating the first identity verification information; the method further includes: calculating the key of the first algorithm, the second ciphertext and the third value by using the first algorithm to obtain a second check value; and transmitting the second check value and the second ciphertext to the biometric identification apparatus, where the second check value is used to determine whether the second ciphertext is valid.

The beneficial effect of the present application is that: since the key of the third session includes at least one key of a fourth session, the driving unit can use the at least one key of the fourth session circularly each time information is transmitted, instead of using only one fixed key of a session, thereby improving the reliability of biometric identification information transmission. In addition, the present application can also encrypt the transmission of biometric identification information through the key of the third session, thereby improving the flexibility of the biometric identification information transmission.

Optionally, when it is determined that the session between the biometric identification apparatus and the driving unit is established successfully, receiving a first ciphertext from the biometric identification apparatus; and decrypting the first ciphertext by using the key of the third session or the key of the fourth session.

Optionally, where the key of the third session further includes a fourth value, where the fourth value is used to determine a quantity of packets received from the biometric identification apparatus; the method further includes: receiving a first check value from the biometric identification apparatus; calculating the key of the first algorithm, the first ciphertext and the fourth value by using the first algorithm to obtain a fourth check value; and determining whether the first ciphertext is valid according to whether the first check value and the fourth check value being the same.

A system, an apparatus and a storage medium for establishing biometric identification information transmission are described below, where the implementation principles and technical effects thereof are similar to those of the method according to the first aspect, the method according to the second aspect, the alternative implementations according to the first aspect, and the alternative implementations according to the second aspect, and will not be repeated herein.

In a third aspect, the present application provides a system for establishing biometric identification information transmission, including: a biometric identification apparatus and a driving unit;

where the biometric identification apparatus is configured to:

transmit a first random number to the driving unit;

receive a second random number and a first identity verification information from the driving unit;

generate a key of a first session according to the first random number, the second random number and a pre-shared key, and generate a second identity verification information according to the key of the first session, the first random number and the second random number;

transmit the second identity verification information to the driving unit, and determine, according to the first identity verification information and the second identity verification information, whether a session between the biometric identification apparatus and the driving unit is established successfully; and where the driving unit is configured to:

generate a key of a third session according to the first random number, the second random number and the pre-shared key, and generate a first identity verification information according to the key of the third session, the first random number and the second random number; and determine, according to the first identity verification information and the second identity verification information, whether a session between the biometric identification apparatus and the driving unit is established successfully.

In a fourth aspect, the present application provides a computer storage medium including computer instructions when executed by a computer, causing the computer to implement any one of the method according to the first aspect, the method according to the second aspect, the alternative implementations according to the first aspect and the alternative implementations according to the second aspect.

In a fifth aspect, the present application provides a computer program product including instructions, when the instructions being executed by a computer, cause the computer to perform any one of the methods according to the first aspect, the second aspect, the alternative implementations according to the first aspect and the alternative implementations according to the second aspect.

In a sixth aspect, the present application provides a biometric identification apparatus including a sensor and a micro control unit, where the sensor is configured to collect biometric identification information, and the micro control unit is configured to perform any one of the methods according to the first aspect and the alternative implementations of the first aspect to establish a biometric identification information transmission channel between the biometric identification apparatus and a driving unit, where the biometric identification information transmission channel is used for transmitting the biometric identification information.

The present application provides a method, an apparatus, a system, and a storage medium for establishing biometric identification information transmission, including: transmitting a first random number to a driving unit; receiving a second random number and a first identity verification information from the driving unit; generating a key of a first session according to the first random number, the second random number and a pre-shared key, and generating a second identity verification information according to the key of the first session, the first random number and the second random number; transmitting the second identity verification information to the driving unit, and determining, according to the first identity verification information and the second identity verification information, whether a session between a biometric identification apparatus and the driving unit is established successfully. In the present application, the driving unit or the biometric identification apparatus does not need to select one of a plurality of pre-shared keys, instead, both have been preset with a pre-shared key, and the driving unit in the present application only needs to generate a first identity verification information according to a key of a third session, a first random number and a second random number; similarly, the biometric identification unit only needs to generate a second identity verification information according to a key of a first session, the first random number, and the second random number. However, in the prior art, both the client and the server need to generate identity verification information for all TLS messages. In view of the above, the method for establishing biometric identification information transmission provided by the application reduces the number of handshake interactions, thereby reducing the overhead of a system consisting of the server and the client.

BRIEF DESCRIPTION OF DRAWINGS

In order to illustrate the technical solutions of embodiments of the present application, or the technical solution of the prior art, more clearly, the drawings used in the embodiments of the present application or the prior art will be briefly described below. It is obvious that the drawings in the following description are only some embodiments of the present application; other drawings may be obtained by those of ordinary skill in the art without any creative efforts.

DESCRIPTION OF EMBODIMENTS

The technical solutions of embodiments of the present application will be clearly and comprehensively described in the following with reference to the accompanying drawings to make the objects, technical schemes and advantages of the embodiments of the present application clearer. It is apparent that the described embodiments are merely a part of, rather than all of, the embodiments of the present application. All other embodiments obtained by those of ordinary skill in the art based on the embodiments of the present application without creative efforts shall fall within the scope of the present application.

The terms "first", "second", "third", "fourth", etc. (when presented) in the description, claims and the above figures of the present application are used to distinguish similar objects without describing a specific order or a sequence. It is to be understood that data used in such manners may be interchanged as appropriate, so that the embodiments of the present application described herein can be implemented, for example, in a sequence other than those illustrated or described herein. In addition, the terms "comprise" and "include" and their variations are intended to cover a nonexclusive inclusion, for example, a process, a method, a system, a product, or a device that includes a series of steps or units is not necessarily limited to those steps or units, but may also include other steps or units not explicitly listed or inherent to such process, method, product or device.

Currently, biometric identification information transmission is performed between the MCU and the driving unit using TLS between a client and a server. However, the TLS handshake process is designed to involve too many interactions, resulting in excessive system overhead. In order to solve this technical problem, the present application provides a method, an apparatus, a system, and a storage medium for establishing biometric identification information transmission.

Figure 1:
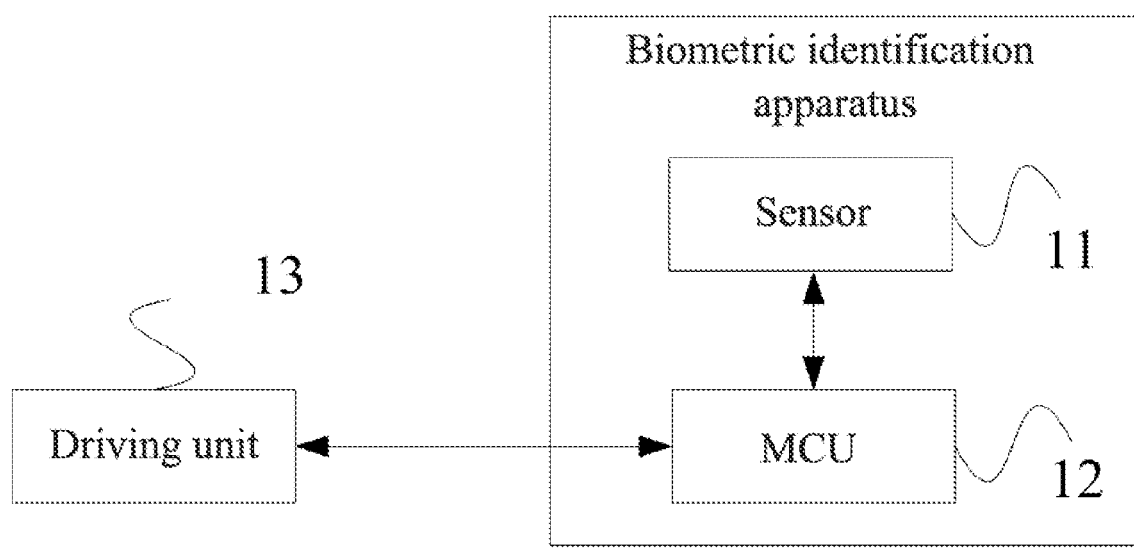
FIG. 1 is a schematic diagram of an application scenario applicable to a method, an apparatus, and a system for establishing biometric identification information transmission according to the present application.

Specifically, FIG. 1 is a schematic diagram of an application scenario applicable to a method, an apparatus, and a system for establishing biometric identification information transmission according to the present application. The application scenario of the present application may be specifically a terminal device, such as a laptop or a personal computer; alternatively, it may also be a mobile terminal, such as a smartphone or a tablet, which includes, as shown in FIG. 1, a sensor 11, a micro processing unit (MCU) 12, and a driving unit 13. The sensor 11 is configured to collect biometric identification information, such as fingerprint information, iris information or face detection information, and output the biometric identification information to the MCU 12. The MCU 12 is configured to establish a biometric identification information transmission channel with the driving unit 13 at a host side, and transmit the biometric identification information to the driving unit 13 at the host side in a communication manner such as a Universal Serial Bus (USB) or a Serial Peripheral Interface (SPI). The driving unit 13 is configured to register or match the biometric identification information, and transmit a registration result or a matching result to the MCU 12. The present application generally provides a process for establishing biometric identification information transmission between the MCU 12 and the driving unit 13.

Specifically, the sensor 11 is used to collect biometric identification information, and the sensor 11 may be referred to as a biometric identification sensor, which may be a fingerprint sensor for detecting fingerprint information or an iris sensor for detecting iris information, or a face sensor for detecting face information.

Further, the biometric identification sensor described above may detect a plurality of biometric identification information simultaneously, for example, a fingerprint sensor may detect fingerprint information, as well as heart rate information, and blood oxygen concentration information and the like.

The driving unit 13 is loaded with a driver of a host operating system through which the biometric identification information can be identified and verified.

As described above, the sensor 11, the MCU 12, and the driving unit 13 may be located in a same terminal device. Alternatively, a biometric identification apparatus consisting of the sensor 11 and the MCU 12, and the driving unit 13 may be located in different terminal devices, which is not limited herein. The terminal device described in the present application may be a laptop, a mobile phone, a computer, a digital broadcasting terminal, a message transceiving device, a gaming console, a tablet device, a medical device, a fitness device, a personal digital assistant and the like, which is not limited herein.

By way of example, assuming the sensor 11, the MCU 12, and the driving unit 13 may be located in a same laptop, where the sensor 11 and the MCU 12 may constitute a biometric identification apparatus. The biometric identification apparatus may be integrated in the power button or another position of the laptop. The driving unit 13 may be a mainboard arranged in the laptop. The laptop may be installed with a windows operating system. Correspondingly, the driving unit 13 is loaded with a driver of the windows operating system.

Based on the above application scenarios, a method, an apparatus, a system, and a storage medium for establishing biometric identification information transmission are described in detail below.

Embodiment 1

Figure 2:
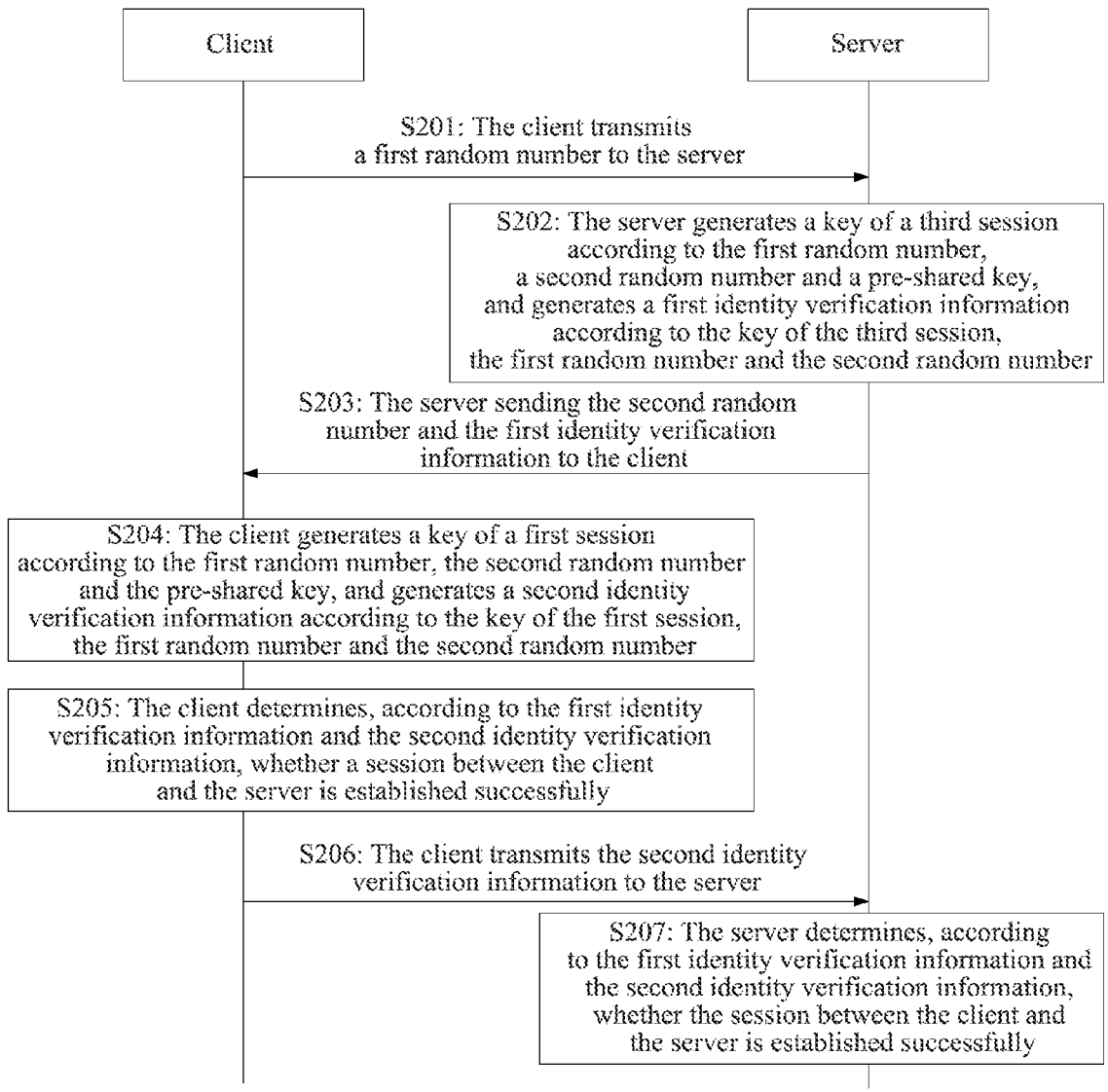
FIG. 2 is an interaction flowchart of a method for establishing biometric identification information transmission according to an embodiment of the present application.

FIG. 2 is an interaction flowchart of a method for establishing biometric identification information transmission according to an embodiment of the present application. As shown in FIG. 2, the method is applied to a system for establishing biometric identification information transmission, where the system includes: a sensor, an MCU, and a driving unit. A biometric identification apparatus including the sensor and the MCU may be defined as a client, and the driving unit may be defined as a server. The present application provides a method for establishing biometric identification information transmission between the client (i.e., the biometric identification apparatus) and the server (i.e., the driving unit), which specifically includes the following steps:

Step S201: the client transmits a first random number to the server.

Step S202: the server generates a key of a third session according to the first random number, a second random number and a pre-shared key, and generating a first identity verification information according to the key of the third session, the first random number and the second random number.

Referring to step S201 and step S202: the first random number is generated by the client using a random number generation method provided in the prior art, and the second random number is generated by the server using the random number generation method provided in the prior art. In the present application, the client has been pre-configured with a pre-shared key (PSK), and the server is pre-configured with the same PSK as the client.

Upon receiving the first random number, the server may use the first random number, the second random number, and the PSK as input parameters for a Pseudo Random Function (PRF), and generate the key of the third session through the PRF.

Optionally, all or part of the key of the third session may be used by the server to encrypt the biometric identification information transmitted to the client. All or part of the key of the third session may also be used by the server to decrypt the biometric identification information received from the client. The biometric identification information received by the server from the client refers to biometric identification information obtained by the client through the sensor. The biometric identification information transmitted by the server to the client refers to a fingerprint identification result returned to the client by the server.

Further, in an alternative embodiment, the server uses part or all of the key of the third session, the first random number, and the second random number as input parameters for Hash-based Message Authentication Code (HMAC) and generates the first identity verification information by using the HMAC algorithm. In fact, HMAC is a hash algorithm, therefore the first check information is actually a message digest of a message containing of the first random number and the second random number.

Optionally, when a part of the key of the third session is used as an input parameter for the HMAC algorithm to calculate the first identity verification information, the part of the key of the third session may be referred to as a key of the HMAC algorithm.

Alternatively, when all of the key of the third session is used as an input parameter for the HMAC algorithm to calculate the first identity verification information, the key of the third session may be referred to as a key of the HMAC algorithm.

In another alternative embodiment, the server uses part or all of the key of the third session, the first random number, and the second random number as input parameters for the PRF, and generates the first identity verification information through the PRF. That is, the function for calculating the first identity verification information is the same as the function for calculating the key of the third session.

It should be noted that the function or algorithm used for calculating the first identity verification information is not limited in the present application.

Step S203: the server sends the second random number and the first identity verification information to the client.

Step S204: the client generates a key of a first session according to the first random number, the second random number and the pre-shared key, and generating a second identity verification information according to the key of the first session, the first random number and the second random number.

Referring to step S203 and step S204, upon receiving the second random number and the first identity verification information, the client may use the first random number, the second random number, and the PSK as input parameters for the PRF, and generate the key of the first session through the PRF. Alternatively, in general, the function or algorithm used by the client for generating the key of the first session and that used by the server for generating the key of the third session should be the same. Based on this, it can be seen that the algorithm used by the client and the server to generate their respective key of a session is the same, and the input parameters are the same, so that the obtained key of the first session and the key of the third session are the same.

Optionally, all or part of the key of the first session may be used by the client to encrypt the biometric identification information transmitted to the server. All or part of the key of the first session may also be used by the client to decrypt the biometric identification information received from the server. The biometric identification information transmitted by the client to the server refers to the biometric identification information obtained by the client from the sensor. The biometric identification information received by the client from the server refers to a registration result or a matching result of the biometric identification information returned to the client by the server.

Further, in an alternative embodiment, the client uses part or all of the key of the first session, the first random number, and the second random number as input parameters for the HMAC, and generates the second identity verification information by using an HMAC algorithm.

Optionally, when a part of the key of the first session is used as an input parameter for the HMAC algorithm to calculate the second identity verification information, the part of the key of the first session may be referred to as a key of the HMAC algorithm.

Alternatively, when all of the key of the first session is used as an input parameter for the HMAC algorithm to calculate the second identity verification information, the key of the first session may be referred to as a key of the HMAC algorithm.

In another alternative embodiment, the client uses part or all of the key of the first session, the first random number, and the second random number as input parameters for the PRF, and generates the second identity verification information through the PRF.

It should be noted that the function or algorithm for calculating the second identity verification information is not limited in the present application.

In the present application, it is required that the function or algorithm used by the server to generate the first identity verification information and that used by the client to generate the second identity verification information are the same.

Step S205: the client determines according to the first identity verification information and the second identity verification information, whether a session between the client and the server is established successfully.

In an alternative embodiment, when the client determines that the first identity verification information and the second identity verification information are the same, the session establishment between the client and the server is determined to be succeeded; when the client determines the first identity verification information and the second identity verification information are different, the session establishment between the client and the server is determined to be failed.

In another alternative embodiment, when the client determines that an absolute value of a difference between the first identity verification information and the second identity verification information is less than a preset threshold, the session establishment between the client and the server is determined to be succeeded; when the client determines that the absolute value of the difference between the first identity verification information and the second identity verification information is greater than or equal to the preset threshold, the session establishment between the client and the server is determined to be failed. The preset threshold may be set according to practical considerations, which is not limited in the present application.

Step S206: the client transmits the second identity verification information to the server.

Step S207: the server determines according to the first identity verification information and the second identity verification information, whether a session between the client and the server is established successfully.

In an alternative embodiment, when the server determines that the first identity verification information and the second identity verification information are the same, the session establishment between the client and the server is determined to be succeeded; when the server determines that the first identity verification information and the second identity verification information are different, the session establishment between the client and the server is determined to be failed.

In another alternative embodiment, when the server determines that an absolute value of a difference between the first identity verification information and the second identity verification information is less than a preset threshold, the session establishment between the client and the server is determined to be succeeded; when the server determines that the absolute value of the difference between the first identity verification information and the second identity verification information is greater than or equal to the preset threshold, the session establishment between the client and the server is determined to be failed. The preset threshold may be set according to practical considerations, which is not limited in the present application.

It should be noted that, the execution sequence of the steps S201 to S204 according to the present application is not limited to the sequence mentioned above, as long as the client obtains the second random number before generating the key of the first session, and the server obtains the first random number before generating the key of the third session. For example, in the present application, the server may transmit the second random number to the client at first, and then the client may generate the key of the first session according to the first random number, the second random number, and the pre-shared key, and generate the second identity verification information according to the key of the first session, the first random number and the second random number; and transmit the first random number and the second identity verification information to the server, where the server may generate the key of the third session according to the first random value, the second random value and the second identity verification information, and generate the first identity verification information according to the key of the third session, the first random value and the second random value.

The execution sequence of steps S205 to S207 according to the present application is not limited to the sequence mentioned above, as long as the server receives the second identity verification information before determining whether the session between the client and the server is established successfully, and the client receives the first identity verification information before determining whether the session between the client and the server is established successfully.

Optionally, after the step S205, the client may transmit a first indication information to the server to indicate whether the session establishment between the client and the server is successful.

Optionally, after the step S207, the server may transmit a second indication information to the client to indicate whether the session establishment between the client and the server is successful.

The present application provides a method for establishing biometric identification information transmission, including: transmitting a first random number to the server by the client; generating a key of a third session according to the first random number, a second random number and a pre-shared key by the server, and generating a first identity verification information according to the key of the third session, the first random number and the second random number by the server; sending the second random number and the first identity verification information to the client by the server; generating a key of a first session according to the first random number, the second random number and the pre-shared key by the client, and generating a second identity verification information according to the key of the first session, the first random number and the second random number by the client; determining according to the first identity verification information and the second identity verification information, whether a session between the client and the server is established successfully by the client; transmitting the second identity verification information to the server by the client; determining according to the first identity verification information and the second identity verification information, whether a session between the client and the server is established successfully by the server. In the present application, the server or the client does not need to select one of a plurality of pre-shared keys, instead, both have been preset with a pre-shared key, and the server in the present application only needs to generate a first identity verification information according to a key of a third session, a first random number and a second random number; similarly, the client only needs to generate a second identity verification information according to a key of a first session, the first random number, and the second random number. However, in the prior art, both the client and the server need to generate identity verification information for all TLS messages. In view of the above, the method for establishing biometric identification information transmission provided by the application reduces the number of handshake interactions, thereby reducing the overhead of a system formed by the server and the client.

Embodiment 2

Based on the Embodiment 1, the key of the first session further includes at least one key of a second session.

Figure 3:
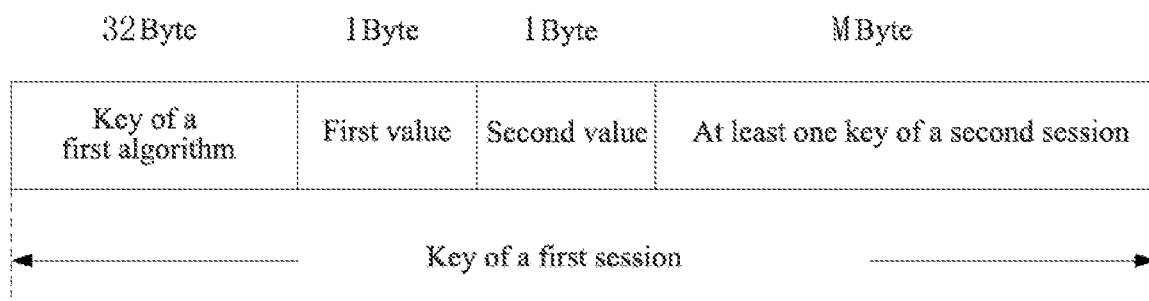
FIG. 3 is a schematic diagram of a key of a first session according to an embodiment of the present application.

Specifically, FIG. 3 is a schematic diagram of a key of a first session according to an embodiment of the present application. As shown in FIG. 3, the key of the first session have a length of 48 bytes, and the last M bytes are N keys of the second session, where N is a positive integer greater than or equal to 1. The client may determine according to the number of bytes M pre-configured for the at least one key of the second session and the length L of the key of the second session, for example, the client pre-configures a total of 32 bytes for all the key of the second sessions. And the length of the key of the second session is set to 8, then N=32/8=4, where "I" refers to "divide" in mathematics. Assuming N is 1, then biometric identification information transmitted by the client each time uses the key of the second session. Assuming N is greater than 1, the client can use N keys of the second session circularly. For example, when N is 3, the three keys of the second session are key A of a second session, key B of a second session, and key C of a second session, respectively. And the client uses the key A of the second session for the first biometric identification information transmission, uses the key B of the second session for the second biometric identification information transmission, and uses the key C of the second session for the third biometric identification information transmission. The client continues to use the key A of the second session for the fourth biometric identification information transmission. Based on this, the three keys of the second session are used sequentially and circularly.

Optionally, the key of the first session further includes a first value and a key of a first algorithm.

The first value is used to determine a quantity of packets transmitted by the client to the server; optionally, the first value may be an initial value of a first counter corresponding to the client, where the first counter is configured to count a quantity of packets transmitted by the client to the server.

The first algorithm is an algorithm for generating the second identity verification information. For example, when the algorithm for generating the second identity verification information is the HMAC algorithm, the first algorithm herein refers to the HMAC algorithm, and the key of the first algorithm is the key of the HMAC algorithm. When the algorithm for generating the second identity verification information is the PRF algorithm, the first algorithm herein refers to the PRF algorithm. And the key of the first algorithm is the key of the PRF algorithm.

Figure 4:
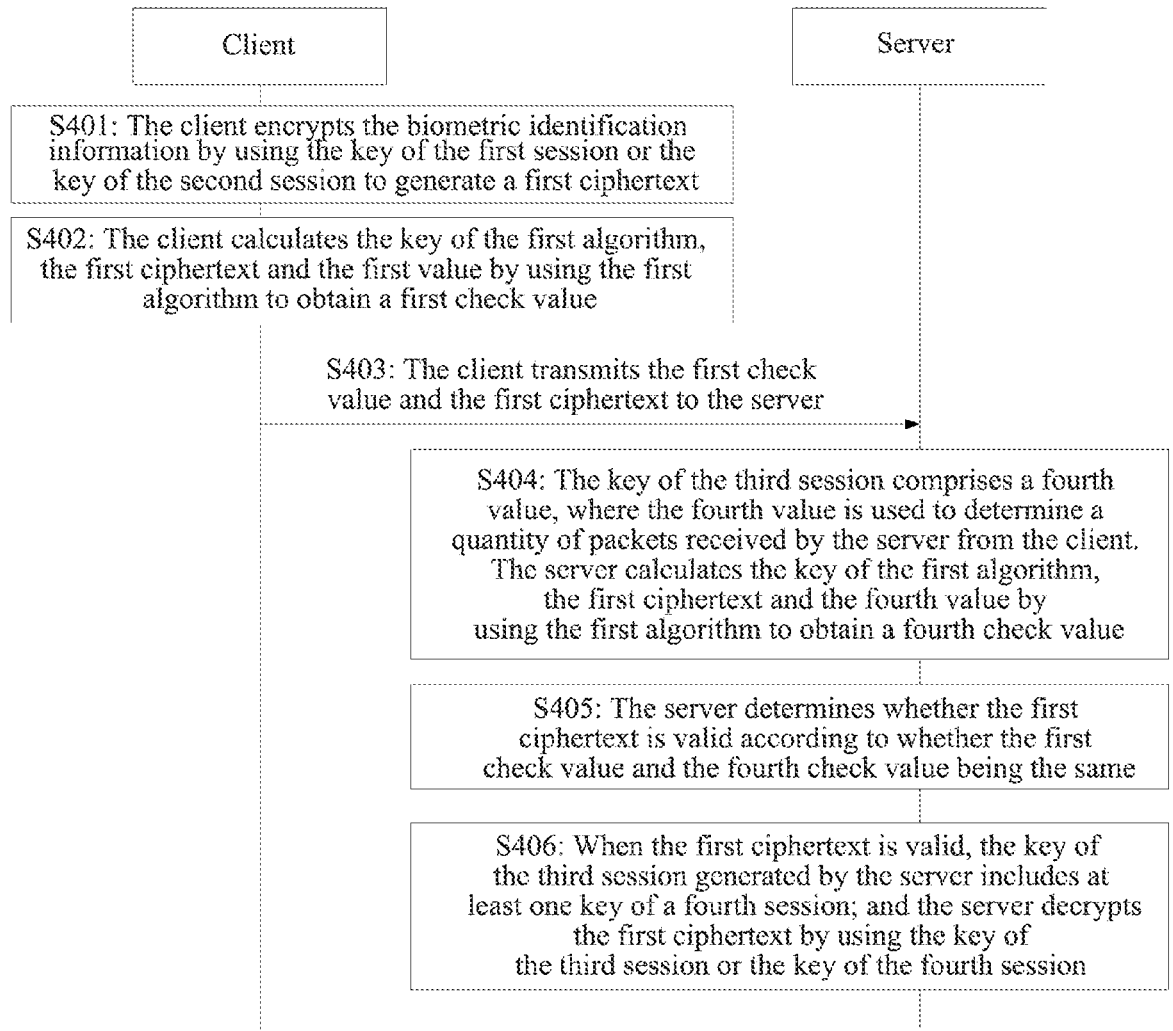
FIG. 4 is an interaction flowchart of a method for establishing biometric identification information transmission according to an embodiment of the present application.

With reference to FIG. 3, after determining that the session between the client and the server is successfully established, the present application provides a process for biometric identification information transmission between the client and the server. FIG. 4 is an interaction flowchart of a method for establishing biometric identification information transmission according to an embodiment of the present application. As shown in FIG. 4, the method includes the following steps:

Step S401: the client encrypts the biometric identification information by using the key of the first session or the key of the second session to generate a first ciphertext.

Optionally, the first ciphertext may be data obtained by the client via encrypting biometric identification information collected by the sensor.

Optionally, the client uses the entire key of the first session as an encryption key, and encrypts the biometric identification information by the key of the first session to generate the first ciphertext.

Optionally, the client uses the key of the second session as an encryption key, and encrypts the biometric identification information by the key of the second session to generate the first ciphertext.

The client may use the existing algorithms such as Identity Based Encryption (IBE) or Advanced Encryption Standard (AES) for the biometric identification information, which is not limited herein.

Step S402: the client calculates the key of the first algorithm, the first ciphertext and the first value by using the first algorithm to obtain a first check value.

As mentioned above, the first algorithm may be an HMAC algorithm or a PRF algorithm. Correspondingly, the keys of the first algorithm are the key of the HMAC algorithm and the key of the PRF algorithm, respectively. The key of the first algorithm, the first ciphertext and the first value are used as input parameters for the first algorithm, and the first check value is an output parameter of the first algorithm.

Figure 5:
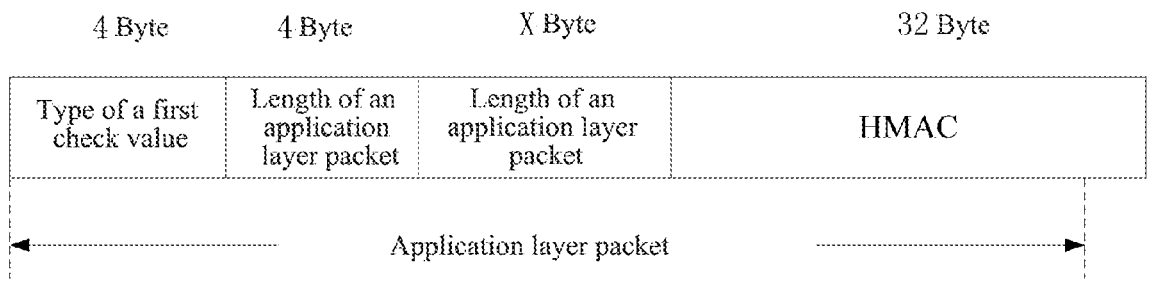
FIG. 5 is a schematic diagram of a transmission format of an application layer packet according to an embodiment of the present application.

FIG. 5 is a schematic diagram of a transmission format of an application layer packet according to an embodiment of the present application. As shown in FIG. 5, the application layer packet includes: 4 bytes for a type of the first check value, 4 bytes for a length of the application layer packet, X bytes for the first check value and 32 bytes for an identifier of the first algorithm HMAC, where X represents a variable length.

Step S403: the client transmits the first check value and the first ciphertext to the server.

Step S404: the key of the third session includes a fourth value, where the fourth value is used to determine a quantity of packets received by the server from the client; the server calculates the key of the first algorithm, the first ciphertext and the fourth value by using the first algorithm to obtain a fourth check value.

Referring to step S403 and step S404, the first value included in the key of the first session is the same as the fourth value included in the key of the third session, that is, the initial value of the quantity of packets received by the server from the client is the same as the initial value of the quantity of packets transmitted from the client to the server. Based on this, when no packet loss occurs between the client and the server, the quantity of packets transmitted by the client to the server that is determined according to the first value is the same as the quantity of packets received by the server from the client that is determined according to the fourth value. Therefore, the fourth check value calculated by the server should be the same as the received first check value. Otherwise, when packet loss occurs between the client and the server, the quantity of packets transmitted by the client to the server that is determined according to the first value is different from the quantity of packets received by the server from the client that is determined according to the fourth value. Thus, the fourth check value calculated by the server should be different from the received first check value.

Step S405: the server determines whether the first ciphertext is valid according to whether the first check value and the fourth check value being the same.

Step S406: when the first ciphertext is valid, the key of the third session generated by the server includes at least one key of a fourth session; and the server decrypts the first ciphertext by using the key of the third session or the key of the fourth session.

Referring to Steps S405 and S406, when the first check value and the fourth check value are the same, no packet loss occurs between the client and the server, and thus the first ciphertext is determined to be valid, and the server decrypts the first ciphertext by using the key of the third session or the key of the fourth session. Otherwise, when the first check value and the fourth check value are different, packet loss has occurred between the client and the server, and thus the first ciphertext is determined to be invalid, and the server can discard the first ciphertext.

It should be noted that the key of the second session and the key of the fourth session are the same. Optionally, the location of the key of the second session in the key of the first session is the same as the location of the key of the fourth session in the key of the third session.

The loop mechanism of the key of the second session used by the client is exactly the same as the loop mechanism of the key of the fourth session used by the server to ensure that the keys for encrypting and decrypting the same biometric identification information are the same.

In the present application, since the key of the first session includes the at least one key of the second session, such that the client can use the at least one key of the second session circularly each time information is transmitted, instead of applying only one fixed key of a session, thereby improving the reliability of biometric identification information transmission. In addition, the present application can also encrypt the transmission of biometric identification information through the key of the first session, thereby improving the flexibility of biometric identification information transmission.

Embodiment 3

On the basis of the Embodiment 2, after the server decrypts the first ciphertext, the server identifies biometric identification information corresponding to the first ciphertext, obtains a biometric identification result, and transmits the biometric identification result to the client. As with the client, the server also needs to encrypt the biometric identification result to obtain a second ciphertext.

Figure 6:
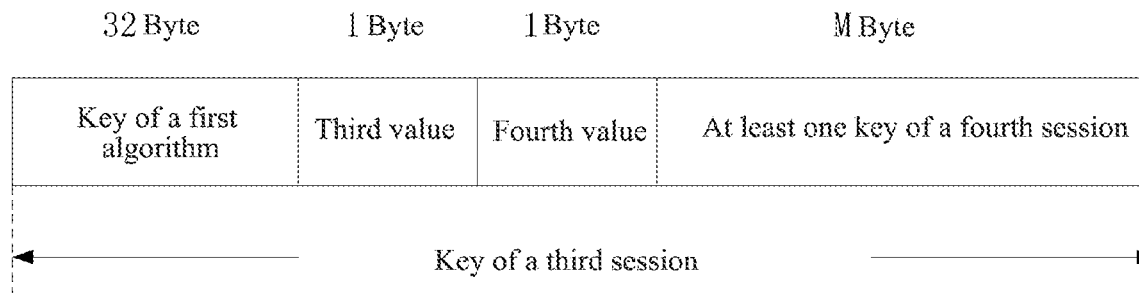
FIG. 6 is a schematic diagram of a key of a third session according to an embodiment of the present application.

Before introducing the transmission process of the second ciphertext, the present application first introduces the key of the third session. The key of the third session includes at least one key of a fourth session. Specifically, FIG. 6 is a schematic diagram of a key of a third session according to an embodiment of the present application. As shown in FIG. 3, the key of the second session has a length of 48 bytes, and the last M bytes are N keys of the fourth session, where N is a positive integer greater than or equal to 1. The server may determine according to the number of bytes M pre-configured for the at least one key of the fourth session and the length L of the key of the fourth session. For example, the server pre-configures a total of 32 bytes for all the key of the fourth sessions. The length of the key of the second session is set to 8, then N=32/8=4, where "I" refers to "divide" in mathematics. Assuming N is 1, biometric identification information transmitted by the server each time uses the key of the fourth session. Assuming that N is greater than 1, then the server can use N keys of the fourth session circularly. For example, when N is 3, the three keys of the fourth session are key A of a fourth session, key B of a fourth session, and key C of a fourth session, respectively. And the server uses the key A of the fourth session for the first biometric identification information transmission, uses the key B of the fourth session for the second biometric identification information transmission, and uses the key C of the fourth session for the third biometric identification information transmission. The client continues to use the key A of the fourth session for the fourth biometric identification information transmission. Based on this, the three keys of the second session are used sequentially and circularly.

Optionally, the key of the third session further includes a third value and a key of the first algorithm.

The third value is used to determine a quantity of packets transmitted by the server to the client; optionally, the third value may be an initial value of a first counter corresponding to the server, where the first counter is configured to count a quantity of packets transmitted by the server to the client.

The first algorithm is an algorithm for generating the first identity verification information. For example, when the algorithm for generating the first identity verification information is the HMAC algorithm, the first algorithm herein refers to the HMAC algorithm, and the key of the first algorithm is the key of the HMAC algorithm. When the algorithm for generating the first identity verification information is the PRF algorithm, the first algorithm herein refers to the PRF algorithm. And the key of the first algorithm is the key of the PRF algorithm.

Figure 7:
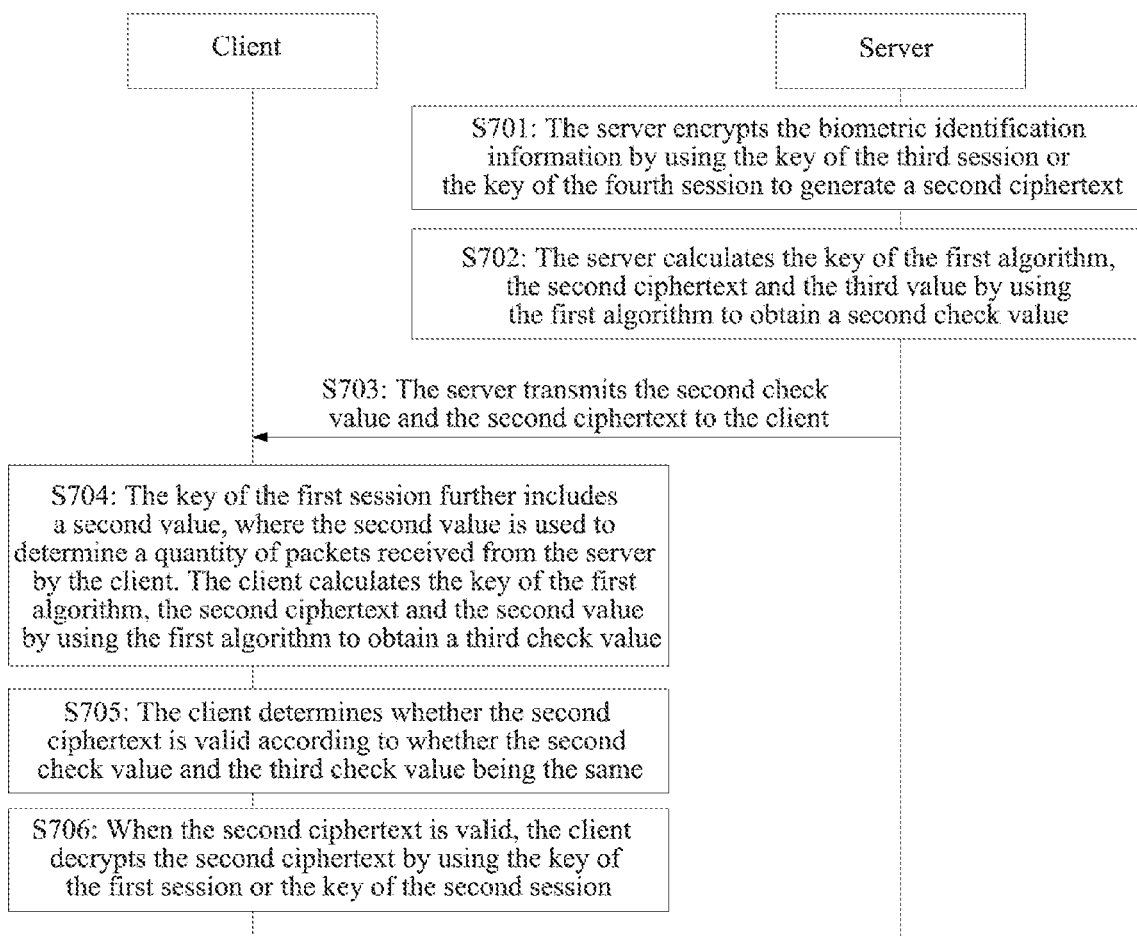
FIG. 7 is an interaction flowchart of a method for establishing biometric identification information transmission according to an embodiment of the present application.

On the basis of the Embodiment 2, FIG. 7 is an interaction flowchart of a method for establishing biometric identification information transmission according to an embodiment of the present application. As shown in FIG. 7, the method includes the following steps:

Step S701: the server encrypts the biometric identification information by using the key of the third session or the key of the fourth session to generate the second ciphertext.

Optionally, the second ciphertext may be data obtained through encrypting the fingerprint identification result by the server.

Optionally, the server uses the entire key of the third session as an encryption key, and encrypts the fingerprint identification result by using the key of the third session to generate a second ciphertext.

Optionally, the server uses the key of the fourth session as an encryption key, and encrypts the fingerprint identification result by using the key of the fourth session to generate a second ciphertext.

The client may use existing algorithms such as IBE or AES for biometric identification information, which is not limited herein.

Step S702: the server calculates the key of the first algorithm, the second ciphertext and the third value by using the first algorithm to obtain a second check value.

As mentioned above, the first algorithm may be an HMAC algorithm or a PRF algorithm. Correspondingly, the keys of the first algorithm are the key of the HMAC algorithm and the key of the PRF algorithm, respectively. The key of the first algorithm, the first ciphertext and the third value are used as input parameters for the first algorithm, and the second check value is an output parameter of the first algorithm.

The transmission format of the second check value is similar to that of FIG. 5, which is not repeated herein.

Step S703: the server transmits the second check value and the second ciphertext to the client.

Step S704: the key of the first session further includes a second value, where the second value is used to determine a quantity of packets received from the server by the client; the client calculates the key of the first algorithm, the second ciphertext and the second value by using the first algorithm to obtain a third check value.

Referring to step S703 and step S704, the second value included in the key of the first session is the same as the third value included in the key of the third session, that is, the initial value of the quantity of packets received by the client from the server is the same as the initial value of the quantity of packets transmitted from the server to the client. Based on this, when no packet loss occurs between the client and the server, the quantity of packets received by the client from the server that is determined according to the second value is the same as the quantity of packets transmitted from the server to the client that is determined according to the third value. Therefore, the third check value calculated by the client should be the same as the received second check value. Otherwise, when packet loss occurs between the client and the server, the quantity of packets received by the client from the server that is determined according to the second value is different from the quantity of packets transmitted from the server to the client that is determined according to the third value. Thus, the third check value calculated by the client should be different from the received second check value.

Step S705: the client determines whether the second ciphertext is valid according to whether the second check value and the third check value being the same.

Step S706: when the second ciphertext is valid, the client decrypts the second ciphertext by using the key of the first session or the key of the second session.

Referring to step S705 and step S706, when the second check value and the third check value are the same, no packet loss occurs between the client and the server, and thus the second ciphertext is determined to be valid, and the client encrypts the second ciphertext by using the key of the first session or the key of the second session. Otherwise, when the second check value and the third check value are different, packet loss has occurred between the client and the server, and thus the second ciphertext is determined to be invalid, and the client can discard the second ciphertext.

It should be noted that the key of the second session and the key of the fourth session are the same. Optionally, the location of the key of the second session in the key of the first session is the same as the location of the key of the fourth session in the key of the third session.

The loop mechanism of the key of the second session used by the client is exactly the same as the loop mechanism of the key of the fourth session used by the server to ensure that the keys for encrypting and decrypting the same biometric identification information are the same.

In the present application, since the key of the third session includes at least one key of a fourth session, such that the server can use the at least one key of the fourth session circularly each time information is transmitted, instead of applying only one fixed key of a session, thereby improving the reliability of biometric identification information transmission. In addition, the present application can also encrypt the transmission of biometric identification information through the key of the third session, thereby improving the flexibility of biometric identification information transmission.

Embodiment 4

Figure 8:
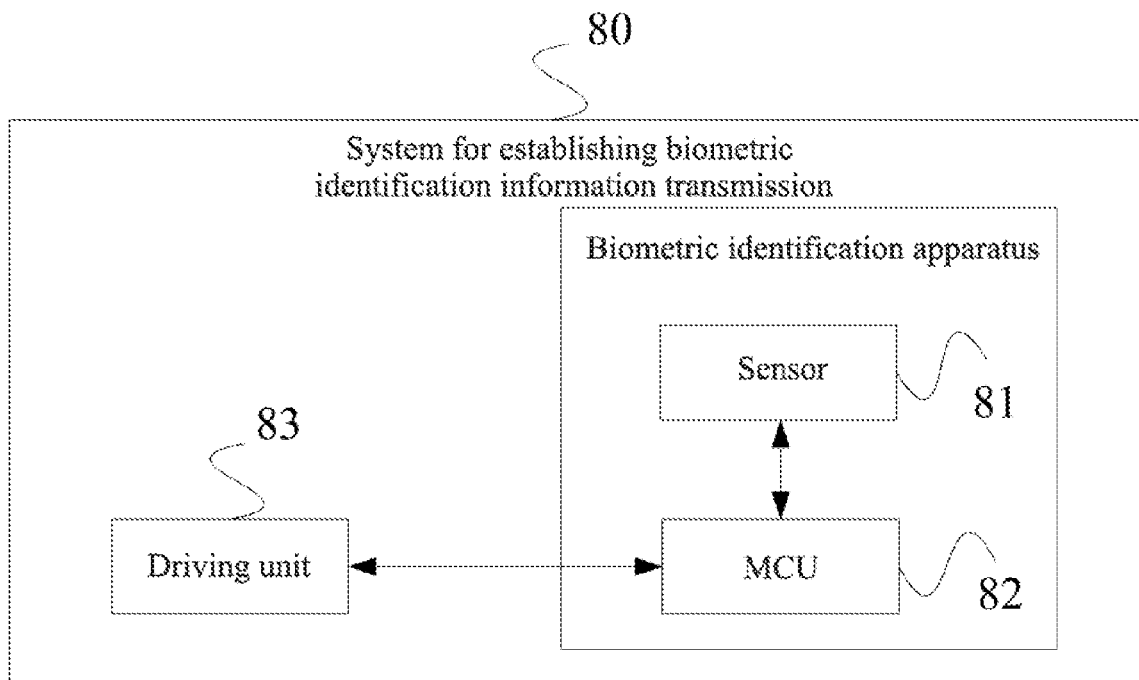
FIG. 8 is a schematic structural diagram of a system 80 for establishing biometric identification information transmission according to an embodiment of the present application.

FIG. 8 is a schematic structural diagram of a system 80 for establishing biometric identification information transmission according to an embodiment of the present application. As shown in FIG. 8, the system 80 includes a sensor 81, an MCU 82, and a driving unit 83. The sensor 81 may be a biometric identification sensor, and the MCU 82 may be a micro control unit corresponding to the sensor 81. In a specific embodiment, the sensor 81 and the MCU 82 may be act as a biometric identification apparatus (it should be understood that the biometric identification apparatus may also include other peripheral circuits or auxiliary circuits), and applied in a terminal device to collect user's biometric identification information for identity verification. The above sensor 81, the MCU 82 and the driving unit 83 may be located in the same terminal device, or the driving unit 83 and the biometric identification apparatus including the above sensor 81 and the MCU 82 may be located in different terminal devices, which is not limited herein.

The sensor 81 is configured to collect biometric identification information and output the biometric identification information to the MCU 82.

The MCU 82 is configured to establish a biometric identification information transmission channel between the biometric identification apparatus and the driving unit, and the biometric identification information transmission channel is configured to transmit the biometric identification information collected by the sensor 81. Specifically, the MCU 82 is configured to: transmit a first random number to the driving unit 83; receive a second random number and a first identity verification information from the driving unit 83; generate a key of a first session according to the first random number, the second random number and a pre-shared key, and generate a second identity verification information according to the key of the first session, the first random number and the second random number; transmit the second identity verification information to the driving unit 83, and determine, according to the first identity verification information and the second identity verification information, whether a session between the MCU 82 and the driving unit 83 is established successfully.

The driving unit 83 is configured to: generate a key of a third session according to the first random number, a second random number and a pre-shared key, and generate a first identity verification information according to the key of the third session, the first random number and the second random number; determine, according to the first identity verification information and the second identity verification information, whether a session between the MCU 82 and the driving unit 83 is established successfully.

Optionally, the key of the first session includes at least one key of a second session; when the MCU 82 determines that the session establishment between the MCU 82 and the driving unit 83 is successful, the MCU 82 is further configured to encrypt the biometric identification information by using the key of the first session or the key of the second session to generate a first ciphertext, and transmit the ciphertext to the driving unit 83.

Optionally, the key of the first session further includes: a first value and a key of a first algorithm, where the first value is used to determine a quantity of packets transmitted by the MCU 82 to the driving unit 83, and the first algorithm is an algorithm for generating the second identity verification information. The MCU 82 is further configured to calculate the key of the first algorithm, the first ciphertext and the first value by using the first algorithm to obtain a first check value; and transmit the first check value and the first ciphertext to the driving unit 83, where the first check value is used to determine whether the first ciphertext is valid.

Optionally, when the MCU 82 determines that the session establishment between the MCU 82 and the driving unit 83 is successful, the MCU 82 is further configured to receive a second ciphertext transmitted by the driving unit 83; and decrypt the second ciphertext by using the key of the first session or the key of the second session.

Optionally, the key of the first session further includes: a second value, where the second value is used to determine a quantity of packets received by the MCU 82 from the driving unit 83. The MCU 82 is further configured to: receive a second check value transmitted by the driving unit 83; calculate the key of the first algorithm, the second ciphertext and the second value by using the first algorithm to obtain a third check value; and determine whether the second ciphertext is valid according to whether the second check value being the same as the third check value.

Optionally, the key of the third session includes at least one key of a fourth session; when the driving unit 83 determines that the session establishment between the MCU 82 and the driving unit 83 is successful, the driving unit 83 is further configured to: encrypt the biometric identification information by using the key of the third session or the key of the fourth session to obtain the second ciphertext, and transmit the second ciphertext to the MCU 82.

Optionally, the key of the third session further includes: a third value and a key of the first algorithm, where the third value is used to determine a quantity of packets transmitted by the driving unit 83 to the MCU 82, where the first algorithm is an algorithm used to generate the first identity verification information. The driving unit 83 is further configured to: calculate the key of the first algorithm, the second ciphertext and the third value by using the first algorithm to obtain the second check value; and transmit the second check value and the second ciphertext to the driving unit 83, where the second check value is used to determine whether the second ciphertext is valid.

Optionally, when the driving unit 83 determines that the session establishment between the MCU 82 and the driving unit 83 is successful, the driving unit 83 is further configured to receive the first ciphertext transmit by the MCU 82; and decrypt the first ciphertext by using the key of the third session or the key of the fourth session.

Optionally, the key of the third session further includes a fourth value, where the fourth value is used to determine a quantity of packets received by the driving unit 83 from the MCU 82. The driving unit 83 is further configured to receive a first check value transmitted by the MCU 82; calculate the key of the first algorithm, the first ciphertext and the fourth value by using the first algorithm to obtain the fourth check value; and determine whether the first ciphertext is valid according to whether the first check value being the same as the fourth check value.

The system for establishing biometric identification information transmission according to the embodiment of the present application may perform the method for establishing biometric identification information transmission in corresponding embodiments of FIG. 2, FIG. 4 and FIG. 7 and alternative implementations of the method, where the implementation principles and the technical effects are similar, which are not repeated herein.

Embodiment 5

The present application provides a computer storage medium including computer instructions that, when executed by a computer, cause the computer to implement a method for establishing biometric identification information transmission as described herein.

Embodiment 6

The present application provides a computer program product including instructions, when the instruction being executed by a computer, cause the computer to perform a method for establishing biometric identification information transmission as described herein.

Embodiment 7

Figure 9:
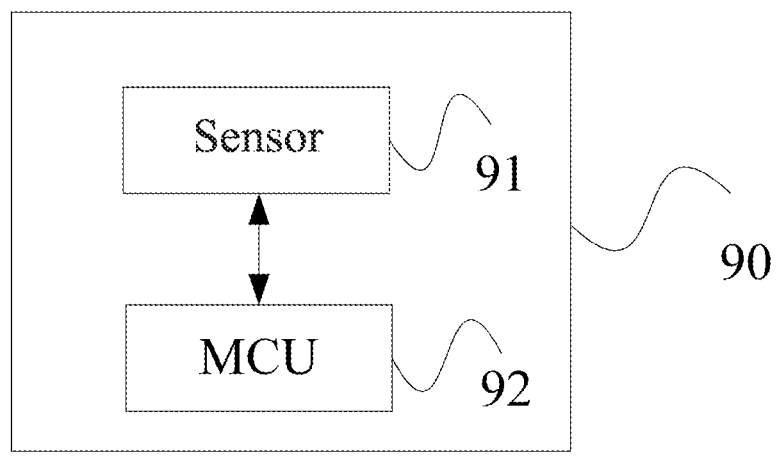
FIG. 9 is a schematic structural diagram of a biometric identification apparatus 90 according to an embodiment of the present application.

FIG. 9 is a schematic structural diagram of a biometric identification apparatus 90 according to an embodiment of the present application. As shown in FIG. 9, the apparatus 90 includes a sensor 91 and an MCU 92. The sensor 91 may be a biometric identification sensor, and the MCU 92 may be a micro control unit corresponding to the sensor 91 (it should be understood that the biometric identification apparatus may also include other peripheral circuits or auxiliary circuits), and be applied in a terminal device to collect user's biometric identification information for identity verification.

The sensor 91 is configured to collect biometric identification information and output the biometric identification information to the MCU 92.

The MCU 92 is configured to establish a biometric identification information transmission channel between the biometric identification apparatus and a driving unit, where the biometric identification information transmission channel is configured to transmit the biometric identification information collected by the sensor 91. Specifically, the MCU 92 is configured to perform the method performed by the MCU in an embodiment corresponding to FIG. 2, FIG. 4 and FIG. 7 according to the present application.

Those of ordinary skill in the art will appreciate that all or part of the steps in each method embodiment may be implemented through program instruction-related hardware. The aforementioned program may be stored in a computer readable storage medium. The program, when executed, performs steps including those in the foregoing method embodiments; and the storage medium includes various media that can store program codes, such as a Read-Only Memory (ROM), a Random Access Memory (RAM), a magnetic disk, or an optical disk.

At last, it should be noted that the above embodiments are merely illustrative of the technical solutions of the present application, and are not intended to be limiting. Although the present application has been described in detail with reference to the foregoing embodiments, those skilled in the art will understand that the technical solutions described in the foregoing embodiments may be modified, or that some or all of the technical features may be equivalently substituted; these modifications or substitutions do not deviate the nature of the corresponding technical solution from the scope of the technical solutions of various embodiments according to the present application.

What is claimed is:

1. A method for establishing biometric identification information transmission, comprising:
   transmitting a first random number to a driving unit;
   receiving a second random number and a first identity verification information from the driving unit;
   generating a key of a first session according to the first random number, the second random number and a pre-shared key, and generating a second identity verification information according to the key of the first session, the first random number and the second random number;
   transmitting the second identity verification information to the driving unit; and
   determining, according to the first identity verification information and the second identity verification information, whether a session between a biometric identification apparatus and the driving unit is established successfully;
   wherein the key of the first session comprises at least one key of a second session, and the method further comprising:
   encrypting the biometric identification information by using the key of the first session or the key of the second session to generate a first ciphertext when it is determined that the session between the biometric identification apparatus and the driving unit is established successfully; and
   transmitting the first ciphertext to the driving unit.

2. The method according to claim 1, wherein the key of the first session further comprises a first value and a key of a first algorithm, wherein the first value is used to determine a quantity of packets transmitted to the driving unit, and the first algorithm is an algorithm for generating the second identity verification information;
   the method further comprising:
   calculating the key of the first algorithm, the first ciphertext and the first value by using the first algorithm to obtain a first check value;
   transmitting the first check value and the first ciphertext to the driving unit, wherein the first check value is used to determine whether the first ciphertext is valid.

3. The method according to claim 2, wherein the method further comprises:
   receiving a second ciphertext from the driving unit when it is determined that the session between the biometric identification apparatus and the driving unit is established successfully; and
   decrypting the second ciphertext by using the key of the first session or the key of the second session.

4. The method according to claim 3, wherein the key of the first session further comprises a second value, wherein the second value is used to determine a quantity of packets received from the driving unit;
   the method further comprising:
   receiving a second check value transmitted by the driving unit;
   calculating the key of the first algorithm, the second ciphertext and the second value by using the first algorithm to obtain a third check value; and
   determining whether the second ciphertext is valid according to whether the second check value and the third check value being the same.

5. A method for establishing biometric identification information transmission, comprising:
   transmitting a second random number to a biometric identification apparatus;
   receiving a first random number and a second identity verification information transmitted by the biometric identification apparatus;
   generating a key of a third session according to the first random number, the second random number and a pre-shared key, and generating a first identity verification information according to the key of the third session, the first random number and the second random number;
   transmitting the first identity verification information to the biometric identification apparatus; and
   determining, according to the first identity verification information and the second identity verification information, whether a session between the biometric identification apparatus and a driving unit is established successfully;
   wherein the key of the third session comprises at least one key of a fourth session; the method further comprising:
   encrypting the biometric identification information by using the key of the third session or the key of the fourth session to generate a second ciphertext when it is determined that the session between the biometric identification apparatus and the driving unit is established successfully; and transmitting the second ciphertext to the biometric identification apparatus.

6. The method according to claim 5, wherein the key of the third session further comprises a third value and a key of a first algorithm, wherein the third value is used to determine a quantity of packets transmitted to the biometric identification apparatus, and the first algorithm is an algorithm for generating the first identity verification information;
the method further comprising:
calculating the key of the first algorithm, the second ciphertext and the third value by using the first algorithm to obtain a second check value; and
transmitting the second check value and the second ciphertext to the biometric identification apparatus, wherein the second check value is used to determine whether the second ciphertext is valid.

7. The method according to claim 6, wherein the method further comprises:
receiving a first ciphertext from the biometric identification apparatus when it is determined that the session between the biometric identification apparatus and the driving unit is established successfully; and
decrypting the first ciphertext by using the key of the third session or the key of the fourth session.

8. The method according to claim 7, wherein the key of the third session further comprises a fourth value, wherein the fourth value is used to determine a quantity of packets received from the biometric identification apparatus;
the method further comprising:
receiving a first check value from the biometric identification apparatus;
calculating the key of the first algorithm, the first ciphertext and the fourth value by using the first algorithm to obtain a fourth check value; and
determining whether the first ciphertext is valid according to whether the first check value and the fourth check value being the same.

9. A system for establishing biometric identification information transmission, comprising: a biometric identification apparatus and a driving unit wherein the biometric identification apparatus comprises a first processor and a first memory, wherein the first memory is configured to store a first set of instructions, and the first processor is configured to execute the first set of instructions stored in the first memory to cause the biometric identification apparatus to:
transmit a first random number to the driving unit;
receive a second random number and a first identity verification information from the driving unit;
generate a key of a first session according to the first random number, the second random number and a pre-shared key, and generate a second identity verification information according to the key of the first session, the first random number and the second random number, wherein the key of the first session comprises at least one key of a second session;
transmit the second identity verification information to the driving unit;
determine, according to the first identity verification information and the second identity verification information, whether a session between the biometric identification apparatus and the driving unit is established successfully; and
encrypt the biometric identification information by using the key of the first session or the key of the second session to generate a first ciphertext when it is determined that the session between the biometric identification apparatus and the driving unit is established successfully, and transmit the first ciphertext to the driving unit;

and wherein the driving unit comprises a second processor and a second memory, wherein the second memory is configured to store a second set of instructions, and the second processor is configured to execute the second set of instructions stored in the second memory to cause the driving unit to:
transmit the second random number to the biometric identification apparatus;
receive the first random number and the second identity verification information transmitted by the biometric identification apparatus;
generate a key of a third session according to the first random number, the second random number and the pre-shared key, and generate a first identity verification information according to the key of the third session, the first random number and the second random number;
transmit the first identity verification information to the biometric identification apparatus; and
determine, according to the first identity verification information and the second identity verification information, whether a session between the biometric identification apparatus and the driving unit is established successfully.

10. The system according to claim 9, wherein the key of the first session further comprises a first value and a key of a first algorithm, wherein the first value is used to determine a quantity of packets transmitted by the biometric identification apparatus to the driving unit, and the first algorithm is an algorithm for generating the second identity verification information;
the first processor is further configured to execute the first set of instructions to cause the biometric identification apparatus to:
calculate the key of the first algorithm, the first ciphertext and the first value by using the first algorithm to obtain a first check value;
transmit the first check value and the first ciphertext to the driving unit, wherein the first check value is used to determine whether the first ciphertext is valid.

11. The system according to claim 10, wherein the first processor is further configured to execute the first set of instructions to cause the biometric identification apparatus to:
receive a second ciphertext from the driving unit when it is determined that the session between the biometric identification apparatus and the driving unit is established successfully; and
decrypt the second ciphertext by using the key of the first session or the key of the second session.

12. The system according to claim 11, wherein the key of the first session further comprises a second value, wherein the second value is used to determine a quantity of packets received from the driving unit by the biometric identification apparatus;
the first processor is further configured to execute the first set of instructions to cause the biometric identification apparatus to:
receive a second check value transmitted by the driving unit;
calculate the key of the first algorithm, the second ciphertext and the second value by using the first algorithm to obtain a third check value; and determine whether the second ciphertext is valid according to whether the second check value and the third check value being the same.

13. The system according to claim 9, wherein the key of the third session comprises at least one key of a fourth session;
the second processor is further configured to execute the second set of instructions to cause the driving unit to:
encrypt the biometric identification information by using the key of the third session or the key of the fourth session to generate a second ciphertext when it is determined that the session between the biometric identification apparatus and the driving unit is established successfully, and transmit the second ciphertext to the biometric identification apparatus.

14. The system according to claim 13, wherein the key of the third session further comprises a third value and a key of a first algorithm, wherein the third value is used to determine a quantity of packets transmitted to the biometric identification apparatus by the driving unit, and the first algorithm is an algorithm for generating the first identity verification information;
the second processor is further configured to execute the second set of instructions to cause the driving unit to:
calculate the key of the first algorithm, the second ciphertext and the third value by using the first algorithm to obtain a second check value; and
transmit the second check value and the second ciphertext to the biometric identification apparatus, wherein the second check value is used to determine whether the second ciphertext is valid.

15. The system according to claim 14, wherein the second processor is further configured to execute the second set of instructions to cause the driving unit to:
receive a first ciphertext from the biometric identification apparatus when it is determined that the session between the biometric identification apparatus and the driving unit is established successfully; and
decrypt the first ciphertext by using the key of the third session or the key of the fourth session.

16. The system according to claim 15, wherein the key of the third session further comprises a fourth value, wherein the fourth value is used to determine a quantity of packets received from the biometric identification apparatus by the driving unit;
the second processor is further configured to execute the second set of instructions to cause the driving unit to:
receive a first check value from the biometric identification apparatus;
calculate the key of the first algorithm, the first ciphertext and the fourth value by using the first algorithm to obtain a fourth check value; and
determine whether the first ciphertext is valid according to whether the first check value and the fourth check value being the same.

17. A biometric identification apparatus, comprising: a sensor and a first processor, wherein the sensor is configured to collect biometric identification information, and the first processor is configured to perform the method according to claim 1 to establish a biometric identification information transmission channel between the biometric identification apparatus and a driving unit, the biometric identification information transmission channel being used to transmit the biometric identification information.

* * * * *